United States Patent

Gilliam

[15] 3,701,212
[45] Oct. 31, 1972

[54] SALT WATER SINKER
[72] Inventor: Joe L. Gilliam, Tampa, Fla.
[73] Assignee: Mary E. Melvin
[22] Filed: Jan. 15, 1970
[21] Appl. No.: 3,172

[52] U.S. Cl. ................43/44.87, 43/44.89, 43/44.9
[51] Int. Cl. ...........................................A01k 95/00
[58] Field of Search.................43/44.87, 44.9, 44.89

[56] References Cited

UNITED STATES PATENTS

| 3,104,488 | 9/1963 | Hicks | 43/44.91 X |
| 3,174,249 | 3/1965 | Louden | 43/44.87 X |
| 2,428,497 | 10/1947 | Meek | 43/44.89 |
| 2,701,427 | 2/1955 | Vironda | 43/44.89 |

FOREIGN PATENTS OR APPLICATIONS

| 4,592 | 1894 | Great Britain | 43/44.9 |

*Primary Examiner*—Samuel Koren
*Assistant Examiner*—Daniel J. Leach
*Attorney*—Stefan M. Stein

[57] ABSTRACT

A sinker designed to be attached to a fishing line or leader comprising a base having a crown arranged in partially spaced relation thereto by means of an elongated slot formed between the crown and the base. A pair of locking arms are also integrally attached to the base and positioned in overhanging relation to the crown. Each of the arms further include an arm slot co-axially aligned with the elongated slot in the crown such that all of the slots are positioned to slidingly engage the line or leader on which the sinker is mounted. Both arms and the crown can be crimped over the respective slots into engagement with the base to prohibit relative movement of the sinker to the line or leader.

6 Claims, 5 Drawing Figures

PATENTED OCT 31 1972

3,701,212

Joe L. Gilliam
INVENTOR.

BY Joe L. Gilliam

SALT WATER SINKER

This invention relates to fishing sinkers and particularly to a salt water sinker having an easy attachment and detachment from a wire leader.

While sinkers are generally well known, there are none presently available which can be attached to a wire leader without cutting or bending the wire.

Accordingly an important object of this invention is to provide an improved salt water sinker being capable of efficient attachment and detachment from wire leaders.

Another object of the invention is the provision of a salt water sinker having unitary construction and providing simple insertion and sliding motion to lock the sinker to the wire.

Other advantages of the invention reside in its simplicity of construction and actual use, in its durability, in its adaptability for use with numerous types of flexible and flaccid leaders, such as wire, Steelon, monofilament, silk, nylon, cotton or other fishing lines, and its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein.

Figure 1:
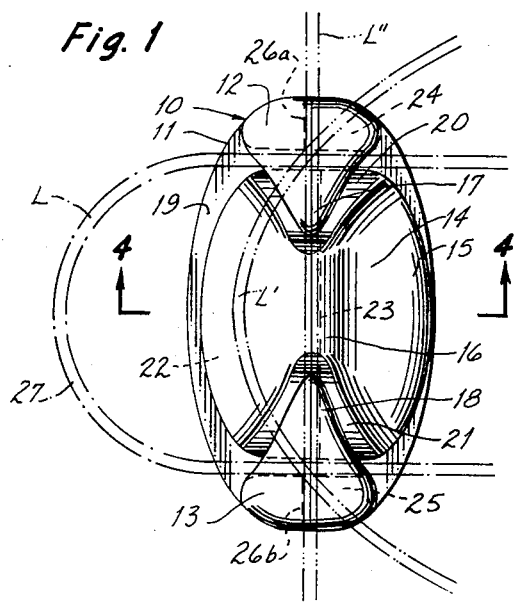
FIG. 1 is a top view of the sinker.
Figure 2:
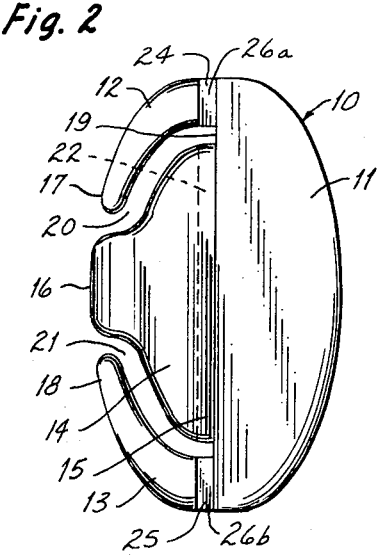
FIG. 2 is a side view of the sinker.
Figure 3:
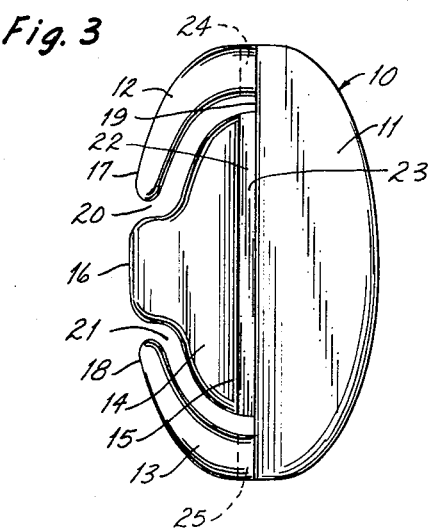
FIG. 3 is the side view of the sinker opposite from the side shown in FIG. 2.

Referring more particularly now to the drawings and specifically to FIGS. 1, 2, and 3, it can be seen that the numeral 10 refers generally to the whole sinker itself which comprises an ellipsoidal base 11, at each end of which there are locking arms 12 and 13 extending upwardly and inwardly over a centrally located protrusion or crown 14. As may best be seen in FIGS. 2 and 3, it will be noted that the configuration of the crown is such that the base 15 of the crown 14 is larger where it is joined at a plane 19 to the base 11 of the sinker; from that point it curves gently upwardly and inwardly and thence upwardly again until its peak 16 achieves and surpasses the same height as the tops 17 and 18 of the arms 12 and 13 respectively. As also noted in FIGS. 2 and 3, the inner surfaces of the arms 12 and 13 conform to the outer configurations of the crown 14 forming curved slots 20 and 21 terminating at the plane 19 upon which the base 15 of the crown 14 and the arms 12 and 13 join with the base 11 of the sinker 10.

Figure 4:
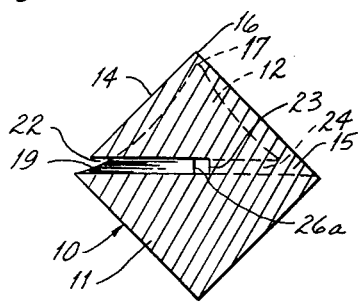
FIG. 4 is a sectional view of the sinker as would be seen along a cut indicated by 4 — 4 of FIG. 1.
Figure 5:
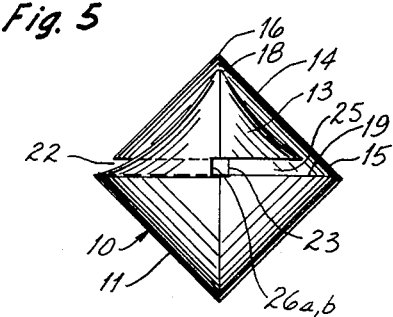
FIG. 5 is an end view of the sinker.

Further examination of the drawings will disclose that a little less than one half of the base 15 of the crown 14 actually joins the base 11 of the sinker 10 and that the remaining portion of the crown 14 lies a spaced distance above plane 19 of the sinker base 11 forming slot 22 which terminates at crotch 23. Likewise, but facing the opposite direction, arms 12 and 13 join the plane 19 with a little less than one half of their actual width to form slots 24 and 25, which terminate at crotches 26a and 26b. Therefore, as viewed in FIGS. 4 and 5, the respective crotches of the slots extend beyond each other above the plane 19 to form what appears, in essence, as a generally square shaped hole.

Referring once again to FIG. 1, the manner in which the sinker is attached to a leader wire can be seen, to wit: leader wire L is laid into curved slots 20 and 21 forming a loop 27 which lies in a plane with plane 19. As the leader wire is straightened out, its looped configuration opens up as indicated by L', being only minimally restricted by the crotches 26a and 26b, thereby preventing kinking of the leader wire. Finally, as indicated by L'', the leader wire is completely straightened out and the sinker is free to slide up and down the leader wire without restriction; however, it cannot accidentally fall off or be removed from the leader wire without reversing the installation procedure as described above. Crown 14 and locking arm 12 and 13 as stated above, are integrally formed to base 11. However, it should be noted that both the locking arms and the crown can be crimped over the respective slots 23, 24 and 25 into engagement with the plane 19 of base 11 thereby prohibiting relative movement of the sinker to the leader or line L. In addition the locking arms 12 and 13 can be crimped over on to the crown 16. This allows relative sliding movement of the line to the sinker but prohibits the inadvertent removal of the line from the sinker in that curved slots 20 and 21 are closed. The arms can of course be returned to their original position for easy removal of the sinker from the line.

From the foregoing descriptions and explanations there has been shown a preferred embodiment of certain new and useful features of a proposed salt water sinker. Other variations and modifications may become apparent to those skilled in the related art. Accordingly, it is not desired to limit the invention to this disclosure, and various modifications may be resorted to, such as may lie within the spirit and scope of the appended claims.

What is claimed as new is:

1. A one piece fishing sinker comprising a base, a crown integrally formed on said base, an elongated slot extending along the length of said crown and positioned between said crown and said base, at least two locking arms oppositely disposed to one another at each end of said sinker, said arms integrally connected to said base and positioned in overhanging relation to said crown whereby crimping of said arms onto said crown prohibits inadvertent removal of a line to which said sinker is attached.

2. A fishing sinker as in claim 1 wherein an arm slot is formed in each of said locking arms between said arm and said base, said arm slots being co-axially aligned with the elongated slot formed in said crown, whereby said slots are adapted to engage a line such that said sinker is movable along a predetermined length thereof.

3. A fishing sinker as in claim 2 wherein said arm slots each include an open side permitting entrance thereto of the line on which said sinker is mounted, said elongated slot including an open side disposed oppositely to said open sides of said arm slots, whereby the line is passed between said crown and each of said arms to attach said sinker thereto.

4. A fishing sinker as in claim 2 wherein the dimensions of said slots are sufficiently greater than the line such that said sinker is slidably mounted on the line.

5. A fishing sinker as in claim 1 wherein said crown is pivotally attached to said base such that said crown is movable into crimped position over said elongated slot and into engagement with said base, whereby relative sliding movement between said sinker and the line is prohibited.

6. A fishing sinker as in claim 2 wherein said arms are pivotally attached to said base such that each of said arms is movable into crimped position over said respective arm slot and into engagement with said base, whereby relative sliding movement between said sinker and the line is prohibited.

* * * * *